United States Patent
Coulon et al.

(10) Patent No.: US 9,479,278 B2
(45) Date of Patent: Oct. 25, 2016

(54) METHOD, TERMINAL AND HEADSET FOR WIRELESS FULL-DUPLEX VOICE COMMUNICATION WITH AUTO-SYNC WITHOUT BASE OR SYNC-MASTER

(71) Applicant: BODYSENS, Nimes (FR)

(72) Inventors: Denis Coulon, Nimes (FR); Laurent Bayart, Nimes (FR); Julien Chaix, Nimes (FR); Michael Marin, Nimes (FR)

(73) Assignee: BODYSENS, Nimes (FR)

( * ) Notice: Subject to any disclaimer, the term of this patent is extended or adjusted under 35 U.S.C. 154(b) by 134 days.

(21) Appl. No.: 14/386,808

(22) PCT Filed: Mar. 15, 2013

(86) PCT No.: PCT/FR2013/050546
§ 371 (c)(1),
(2) Date: Sep. 21, 2014

(87) PCT Pub. No.: WO2013/140070
PCT Pub. Date: Sep. 26, 2013

(65) Prior Publication Data
US 2015/0043568 A1  Feb. 12, 2015

(30) Foreign Application Priority Data
Mar. 22, 2012  (FR) ...................................... 12 52574

(51) Int. Cl.
*H04J 3/06* (2006.01)
*H04W 56/00* (2009.01)
(Continued)

(52) U.S. Cl.
CPC ........... *H04J 3/0691* (2013.01); *H04B 7/2643* (2013.01); *H04R 1/10* (2013.01);
(Continued)

(58) Field of Classification Search
CPC . H04J 3/0691; H04W 56/002; H04W 84/18; H04W 84/20; H04B 7/2643; H04R 1/10; H04R 2201/109; H04R 2420/07
See application file for complete search history.

(56) References Cited

U.S. PATENT DOCUMENTS 5,790,536 A * 8/1998 Mahany .............. B60R 16/0231
                                                        235/462.15
8,411,552 B2 * 4/2013 Kim ..................... H04B 1/7083
                                                        370/208
(Continued)

FOREIGN PATENT DOCUMENTS

EP          1143416 A2     10/2001
EP          1333618 A2      8/2003
(Continued)

*Primary Examiner* — Kevin Mew
(74) *Attorney, Agent, or Firm* — IM IP Law PLLC; C. Andrew Im

(57) ABSTRACT

A communication terminal having a digital communication circuit and an automatic synchronizer. The digital communication circuit utilizes time division multiplexing in a single radio channel, selectable in a frequency band. The terminal implements a wireless communication in a conference and hands-free mode on an autonomous network between at least two wearers of similar terminals. The automatic synchronizer synchronizes to the signal of other terminal in the group to synchronize its internal time reference. This ensures the continuity of communication between each terminal in the group within a range of each other, even when the communication is lost with other terminals in the group. No particular terminal is required to maintain the synchronization in the group.

20 Claims, 5 Drawing Sheets

(51) Int. Cl.
    *H04W 84/20*     (2009.01)
    *H04B 7/26*      (2006.01)
    *H04R 1/10*      (2006.01)
    *H04W 84/18*     (2009.01)
(52) U.S. Cl.
    CPC ......... *H04W 56/002* (2013.01); *H04W 84/20* (2013.01); *H04R 2201/109* (2013.01); *H04R 2420/07* (2013.01); *H04W 84/18* (2013.01)

(56) References Cited

U.S. PATENT DOCUMENTS

| | | | | |
|---|---|---|---|---|
| 8,565,138 | B1* | 10/2013 | Yuan | H04W 72/1263 370/312 |
| 2004/0246986 | A1* | 12/2004 | Belcea | G01S 5/0252 370/444 |
| 2007/0248038 | A1* | 10/2007 | Yamasaki | H04B 7/022 370/328 |
| 2007/0248068 | A1* | 10/2007 | Onggosanusi | H04J 11/0069 370/338 |
| 2008/0253327 | A1* | 10/2008 | Kohvakka | H04W 16/14 370/330 |
| 2010/0189086 | A1* | 7/2010 | Kats | H04W 74/04 370/338 |
| 2010/0330930 | A1* | 12/2010 | Twitchell | H04L 12/12 455/73 |
| 2011/0268101 | A1* | 11/2011 | Wang | H04L 5/0053 370/344 |
| 2014/0162545 | A1* | 6/2014 | Edge | H04W 8/005 455/3.01 |

FOREIGN PATENT DOCUMENTS

| | | |
|---|---|---|
| EP | 1843326 A1 | 10/2007 |
| EP | 2244526 A2 | 10/2010 |
| FR | 2947124 A1 | 12/2010 |
| GB | 2362292 A | 11/2001 |

\* cited by examiner

METHOD, TERMINAL AND HEADSET FOR WIRELESS FULL-DUPLEX VOICE COMMUNICATION WITH AUTO-SYNC WITHOUT BASE OR SYNC-MASTER

RELATED APPLICATIONS

This application is a §371 application from PCT/FR2013/050546 filed Mar. 15, 2013, which claims priority from French Patent Application No. 12 52574 filed Mar. 22, 2012, each of which is herein incorporated by reference in its entirety.

TECHNICAL FIELD OF INVENTION

The present invention relates to a method, a terminal and a headset for wireless voice communication with auto-synchronization without base or sync-master. It applies in particular to the establishment of an autonomous multi-user system for voice or data communication by radio, in "conference" or "full-duplex" mode, using a time domain multiplex on a single radio channel. This system functions between at least two terminals and requires neither the presence of a base or of a "master" terminal for synchronizing or an existing infrastructure, and enables the creation of a communication autonomous network guaranteeing continuity of communication between the different terminals, without requiring any configuration of one of them and without any of them having an essential role to maintain the communication.

BACKGROUND OF THE INVENTION

Are known (EP 1143416 A2 Oct. 10, 2001) methodologies for attenuating noise in the time domain for transmission of acoustic signals. This noise suppression allows for better quality of communication in a noisy environment, but does not establish a full-duplex communication for more than two people.

Are known the "walkie-talkie" terminals to create independent networks of portable transceivers, for radio conversation or communication. Except with the use of multiple channels simultaneously, these products do not allow "conference" mode for more than two terminals.

Other types of voice transmission networks are using Bluetooth (registered trademark) technology, the DECT (Digital Enhanced Cordless Telephone), or Wi-Fi (set of communication protocols covered by the of IEEE 802.11 standards, ISO/IEC 8802-11) (trademark) or other protocols and radio bands to enable a conversation in "conference" mode for at least three people through mixer or concentration and redistribution technologies, or time division multiplexing protocols using a dedicated terminal acting in "Master" mode, the other acting in "Slave" mode. In all cases of systems allowing the "conference" mode for more than two terminals, the methods used are facing the need to define a terminal as "Base" or "Master" to mix and/or synchronize the data streams of the other terminals, or use multiple radio channels simultaneously. Some of these systems (FR 2947124 A1 of 24 Dec. 2010) when allowing a shared audio communication using time-division multiplexing on the same radio channel, and thus a conversation in "conference" mode, have the disadvantage of not being able to get rid of the Master terminal without compromising the communication between the other terminals. Thus, losing the radio signal coming from the Master Terminal, out of range or in default, condemns the communication between the other terminals or requires the reconfiguration of one of them in Master mode, this reconfiguration not being always possible without a complex manipulation.

Some techniques used to implement the designation of a single synchronization master on a regular basis in a network of asynchronous passive nodes, using a voting protocol in which each node self eliminates by ceasing transmission of sync frames when it receives a frame with a higher priority than itself (EP 2244526 A2 of 20 Oct. 2010). This technique requires high bit rates and requires in addition the retransmission of the resynchronization frames received from the master by each node to propagate them to all nodes of the network: it is therefore not applicable for use in a synchronous communication context between nodes which is necessary for audio communication in "conference" mode in a time division multiplex mode.

Some other solutions using a master/slave architecture based on time division multiplexing offer the automatic designation of a master when a device receives data frames but not the master ones (GB 2362292 Nov. 14, 2001). These solutions solve the case where the master disappears completely (extinction, breakdown, . . . ), but not the very common case where only some terminals are out of reach of the Master, as they allow the automatic enrollment of a second Master for out of reach terminals, the network then having with two non-necessarily synchronous masters, and thus two time references for time division multiplexing: the operation is then blocked because it goes against the very principle of said time division multiplexing. In this situation, the continuity of communication cannot be guaranteed as there is not ONE synchronized network, but TWO independent networks transmitting on the same radio frequency and creating collisions of data frames.

Other solutions using a master/slave configuration based on time division multiplexing offer automatic reconfiguration of terminals (EP 1843326 Oct. 10, 2007) to replace the master becoming faulty (out of range, extinction, . . . ). These solutions enable the network to automatically set a new synchronization master but also partially respond to the problems encountered in the field: for example, the case where only some terminals are out of reach of the master but at reach of each other is not supported although extremely common. This solution presents the first disadvantage of causing a failure of communication during reconfiguration, terminals via a state of "sleep" in order to synchronize with the new "Master". As a second major drawback: the establishment of a new Master generates a second autonomous network disrupting communications of the first one.

Thus, in the present state of the art, any terminal being part of a "full-duplex" network on a single channel must be connected (within range) with THE "Master" terminal or THE "Base" to be able to communicate with the other terminals: so it is impossible to guarantee the continuity of communication between terminals within range of each other without depending on the communication of each of them with a "master" or "base" terminal.

OBJECT AND SUMMARY OF THE INVENTION

The present invention seeks to overcome these drawbacks. The present invention aims, in a first aspect, a communication terminal, comprising:

a digital circuit using a time division multiplexing communication on a single radio channel, in a selectable frequency band, said system implementing wireless communication in a "conference" and "hands-free" mode on an autonomous network between at least two wearers of identical devices, an automatic synchronization means, here named "SyncAll", on the radio signal of any device within a group of terminals to synchronize its internal clock to a time reference common for all the terminals of the group, allowing for ensure continuity of communication between each of the terminals of the group within range, even in the case of loss of communication with any of the terminals in the group.

Thanks to these features, a group with self-synchronizing devices is produced, without one of these devices being synchronization "master" or "base" for the other terminals. Thus, the voice or data communication is not interrupted in the event of loss of signal from any terminal.

In embodiments, the digital communication circuit, by applying the technique of time division multiplexing, is configured to transmit and receive digital data over a single channel selected according to a periodic cycle common to all terminals of the group, according to a unique sequence number in the group of terminals, the transmission times of the digital circuitry depending of the unique sequence number within the group, the times of reception taking place during the rest of the periodic cycle, said periodic cycle being based on the time reference common to all terminals of the group defined when synchronizing the terminals.

In embodiments, the digital communication circuit is configured, during the commissioning of the terminal to listen to the network to detect possible transmission of a synchronization frame or data from a terminal of another group and automatically change the communication channel to a free channel to initiate communication with devices of its own group.

In embodiments, the digital communication circuit is configured, during the commissioning of the terminal to listen to the network to detect possible transmission of a synchronization frame or data from another terminal of the same group.

In embodiments, the synchronization means is configured to synchronize to the first synchronization signal or data from another terminal of the same group, and in case of not receiving a signal to transmit at time intervals depending of its order number, its own synchronization signal to the other terminals of the group to initiate communication.

In embodiments, each frame sent by a terminal has both the identifier of the group to which said terminal belongs, the order number of the terminal in the group, as well as the ordered n-level chaining data of the order numbers of the terminals synchronized together. For example with n=2, if a "T5" terminal is synchronized with a "T4" terminal which is itself synchronized to a "T2" terminal, the chaining data transmitted by the "T5" terminal is "T4,T2."

In embodiments, the synchronization of a terminal on a frame consists of matching the internal time reference of the said terminal with the one of the terminal from which the said terminal has received the said frame. Thus, with successive transmissions between them, all the terminals have the same time reference for the time cycle used for the time division multiplexing. For example, if a terminal "T3" is the origin of the communication, it propagates to "T1" its time reference that can propagate to the "T4" terminal, and so on.

In embodiments, the terminals at regular intervals perform a re-synchronization by resetting their internal time reference based on the one of the terminal from which they received a data or synchronization frame. The periodic re-synchronization is required to compensate for time base drifts inherent to the internal electronic components (quartz) used, these drifts being responsible of shifting the time cycles and inducing overlap after a certain time, with perturbation of radio transmissions. The frequency of re-synchronization depends on the accuracy of the quartz used, the period between re-synchronizations thus being generally several minutes.

In this way, with successive and automatic re-syncs by each of the terminals on the signal from any of the other terminals of the group, the network doesn't need a synchronization "master", both at start or during the use of the terminals in the autonomous created network. This network enables continuous communications between the terminals of the group, and avoids the need to reconfigure manually or automatically one of the terminals from a "Slave" to "Master" or "Base" mode in case of loss of signal or synchronization data from a said "Master" or a said "Base", which corrects the drawbacks of existing systems that require special handling often incompatible with the needs of users in the field.

Furthermore, this synchronization continuously performed on any terminal of the group guarantees the continuity of communication between each of the terminals that are in the radio range. It is not therefore necessary that each terminal is at radio reach of a "Master" terminal to communicate with the terminals close to itself, in contrast to existing systems.

In embodiments, the digital communication circuit is configured to detect the absence of signals transmitted by a counterpart terminal of the group and, upon detection of the absence, enter into a communication initialization mode which consists in alternating network listening phases for detecting a possible synchronization signal or data from another terminal of the same group, and the phases of communication initialization attempts by emitting its own synchronization signal to the other terminals of the group to initiate a communication. The frequency of alternation between the two phases depends on the order number of the terminal in the group, to prevent the terminals to simultaneously attempt to initiate communication.

In embodiments, the terminals implement a priority during the re-synchronization based on the sequence of numbers present in the frames received from other terminals enclosing the order number of the transmitting terminal and the ordered chaining data of the terminals synchronized together. So if they receive sync frames or data from several terminals during the time allocated to the re-synchronization (e.g. 30 seconds), they synchronize in priority on a frame received from the terminal with the smallest order number in the group (denoted "iMin") or, alternatively, on the "closest" terminal of the said active terminal having this "iMin" order number. "Closest" here means proximity in regards to the number of nodes (terminals in radio range with each other) between the terminal and the said terminal with the smallest order number, not a geographic proximity.

The algorithm for determining the proximity is:
when a terminal receives frames from several terminals, it looks for each one for the smallest order number "iMin", between the order number of the transmitter itself and the ordered chaining numbers received from each synchronized terminals;

if the number "iMin" is only present in one of the frames received, the device synchronizes primarily on the terminal that transmitted that particular frame;

if the number "iMin" is present in frames sent out by several terminals, the terminal used for synchronization is the terminal where the number "iMin" has the highest rank in the frame, the rank is defined below:

terminal number in the group (rank "R" being the highest)
number of the first terminal in the chaining (rank R-1)
number of the second terminal in the chaining (rank R-2)
etc, (rank R-x), This principle of prioritized synchronization allows each terminal to synchronize itself with a terminal being directly or indirectly synchronized with the active terminal having the smallest order number in the group. This mechanism avoids the appearance of several "sub-networks", managed by different time references in a group of more than three terminals (e.g. T1 and T2 synchronized together, on the one hand and T3/T4 synchronized together, on the other) with the risk of collision of frames.

In embodiments, the terminal continues to send its data or synchronization frames during the time allocated for the re-synchronization: so there is no breakdown in communication during the phases of re-synchronization.

In embodiments, the terminal object of the present invention further comprises at least one sensor and/or internal functions to ensure triggering of alerts or sending messages to the other terminals of the group by the digital communication circuit.

This ensures the safety of the terminal users, including workers in hostile, confined or aggressive environments. These terminals have, for example, an internal sound or vibration device in their housing (piezoelectric speaker or "buzzer" for example) to generate alerts or call signals to the other users indecently from the audio circuit.

These terminals may also be fitted with integrated accelerometers and/or gyroscopes to detect shocks or immobility of the carrier of the terminal and its orientation in the vertical plane. In embodiments, at least one terminal is equipped with sensors like accelerometers (ADLX335, trademark, or equivalent) detecting the shocks, and other immobility detection means by setting accelerations thresholds during a given time. This information is transmitted wirelessly to other terminals.

In embodiments, at least one terminal is equipped with temperature sensors, gas or potentially hazardous atmospheres (CMOS sensors for H2, CO, CO2, NOx, etc.) to communicate this information to the wearer and the other terminals.

Preferably, the alert triggers are customizable.

In embodiments, at least one terminal is equipped with sensors or detector to know the exact position of the terminal (integrated GPS receiver DELORME GPS2058-10 Type Module, Galileo, trademarks, or equivalent).

In embodiments, the object of the present invention further comprises a means for determining whether or not a sound is to be represented by a digital signal by the communication circuit, the communication circuit being configured for, in case of absence, represent and transmit a frame having a smaller size than the frame representing a sound, and transmit this absence.

The information sent by the radio are thus significantly reduced and, consequently, resulting in a much shorter transmission time and a much lower occupancy of the radio band.

In embodiments, the digital communication circuit is configured to, in case of absence of sound to represent, only transmit one frame meaning this absence during a plurality of communication cycles.

So, instead of sending frames meaning "No sound" at each cycle time (as it is done when transmitting a "sound"), it sends the frame only once every n cycles. For example n=10. Thus, during the silent phase of a user, it sends data n times less often, resulting in much lower frequency band occupancy and gain in autonomy.

During the silence phases, emitted information is therefore not only shorter, but occurs less often. This solution also allows use of the silence times to transfer data coming from the integrated sensors of the terminal.

Another aspect of the present invention is described below.

Are know the wireless headphones, possibly equipped with hearing protection and allowing listen to music or wirelessly talk (often as Bluetooth,™) with someone via cell phone or "walkie-talkie" radio type for example.

Other types of headsets are provided with hearing protection, passive or active, and connected to wire communication systems such as "intercom" to allow conversations between two or more persons, with or without "Push-To-Talk" buttons.

Thus, none of the known audio headsets propose the following three functions simultaneously:
1—wireless Audio Conversation in full-duplex mode ("conference" mode) for more than two people on a single radio channel, without base or synchronization master and
2—"hands Free" conversation mode on an autonomous radio network and
3—protection to noise, active or passive, to improve audio quality and protect the user.

The present invention also aims to overcome these drawbacks.

The present invention thus relates to a helmet, that incorporates an audio device object of the present invention.

This headset is thus wireless multi-user communicating, and more specifically, a headset including a built-in wireless autonomous vocal communication device, communicating in "conference" or "full-duplex" mode with at least one other similar headset. Each headset system is, preferably equipped with various sensors or detectors to detect impacts or immobility of the wearer, potentially dangerous or toxic atmospheres and/or localization of the headset, and transmit alarms or alert signals.

In embodiments, the subject of the invention comprises an ear-shell with a mechanical or acoustic noise protection for the user.

In embodiments, the subject of the invention comprises a noise protection of active type, using negative noise emission by an electro-acoustic transducer, the sound messages received by the digital communication circuit being transmitted by the said electro-acoustic transducer.

Additional advantages, objects and characteristics of this headset being similar to the terminal object of the present invention, they are not repeated here.

BRIEF DESCRIPTION OF THE DRAWINGS

Additional advantages, objects and characteristics of the present invention will become apparent upon reading the following description, given in an explanatory and not limiting way, with reference to the accompanying drawings, wherein.

DETAILED DESCRIPTION OF EMBODIMENTS

Figure 1:
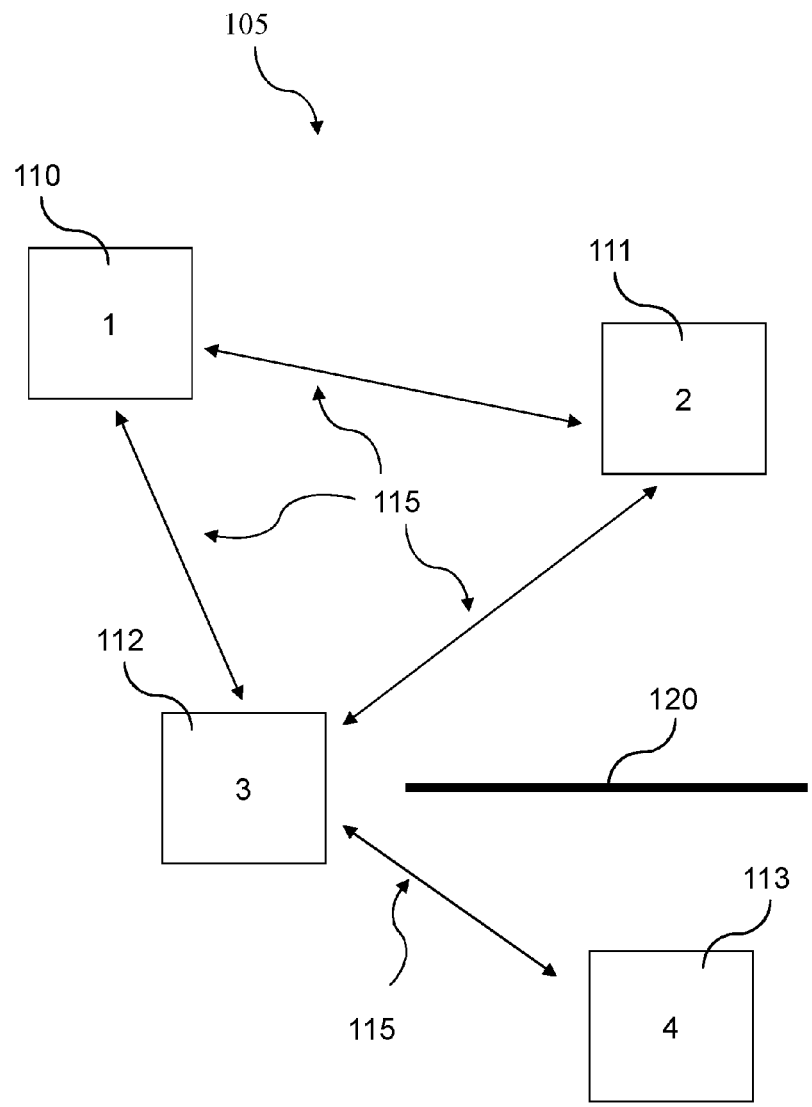
FIG. 1 schematically shows a network of terminals objects of the present invention, FIG. 2 schematically shows a particular embodiment of an object of the present invention headset with a particular embodiment of an object of the present invention

It is observed in FIG. 1, a network 105 of distributed terminals 110 to 113 on a site (not shown), e.g. a field and/or buildings. The arrows 115 represent communications between the terminals 110 to 113 As seen in FIG. 1, it can happen that one of the terminals, here the terminal 113 is no longer in communication with at least one other terminal, here the terminals 110 and 111, for example, this is due to the distance between the terminals, mitigation signals from one of the terminals, for example by a barrier 120, hill or building, for a weak battery, to interference or any other cause known to the skilled wireless.

In a network of the prior art, if the terminal 113 is the master and thus provides the synchronization of the network 105 to the other terminals, those who do not receive its signals cannot communicate. A complex procedure must be implemented to restore synchronization, namely the dynamic or manual creation of a new Master terminal among those who are out of reach of the Master terminal 113. But, in this configuration, the new Master is the terminal 110 or the terminal 111, and accordingly, the terminal 112 receives frames of two Masters: 110 or the terminal 111 and the terminal 113 as it is in radio range with the three terminals which are all master of their subnet, which is in contradiction with the master-slave time-division multiplexing technology based on having a single master and multiple slaves. This case is not manageable with current techniques, and known achievements leave the terminals 110 and 111 disconnected from the communication network 105 as they are not within range of the terminal 113.

In the same situation, in a network of the prior art, when the terminal 110 is the Master and therefore provides synchronization to the other terminals on the network 105, those who did not receive its signals can no longer communicate. In this case, the terminal 113 is not within reach of the terminal 110 which is the Master, it is thus disconnected from the communication network 105, while it is within radio range of the terminal 112, and it could potentially continue to be in communication with it. Radio communication between terminals within range of each other cannot be guaranteed with the master/slave technologies that require a radio link between each of the terminals of the group and the Master or Base terminal.

As stated in the description that follows, however, by implementing the present invention, the terminals of the network do automatically re-synchronize themselves in such circumstances and ensure continuity of communication between each of the terminals in radio range with each other.

Indeed, through the principle of synchronization, called "SyncAll", on any terminal proposed in the present invention group, the terminals 110, 111 and 112 are in radio range with each other, they communicate together and mutually synchronize with each other, and preferably with the terminal having the lowest order number in the group, namely terminal 110 which has the order number "1". The terminal 111 and the terminal 112 are therefore synchronized on the terminal 110 while the terminal 110 synchronizes itself on the terminal 111. Similarly, the terminal 113 is in radio range of the terminal 112, it is synchronized with the terminal 112 and continues to be part of the network associated with this group of terminals, even if it cannot receive signals from the terminal 110 and the terminal 111 because it's out of reach. Thus, the terminal 113 can continue to receive and transmit data with the terminal 112 which is in radio range with it, even if it is out of reach of terminals 110 and 111. At the same time, the terminal 112 receives and transmits data with the set of terminals 110, 111 and 113 which are in radio range with it.

Thus, regardless of the radio range configuration in the encountered zone, communication is ensured within the group between terminals in radio range with each other and the communication does not depend on good communication between the terminals and a specific terminal acting as a Master. We also observe that the use of prioritized re-synchronization prevents the creation of two independent sub-networks consisting of terminals 110 and 111, on the one hand, and terminals 112 and 113 on the other. Indeed, the principle of re-synchronization on the device with the lowest order number (the terminal 110 in our example) implies that the other terminals are synchronized preferentially on it or on those terminals that are close, in terms of number of nodes, to the terminal with the lowest order number and therefore cannot create separate subnet.

Figure 2:
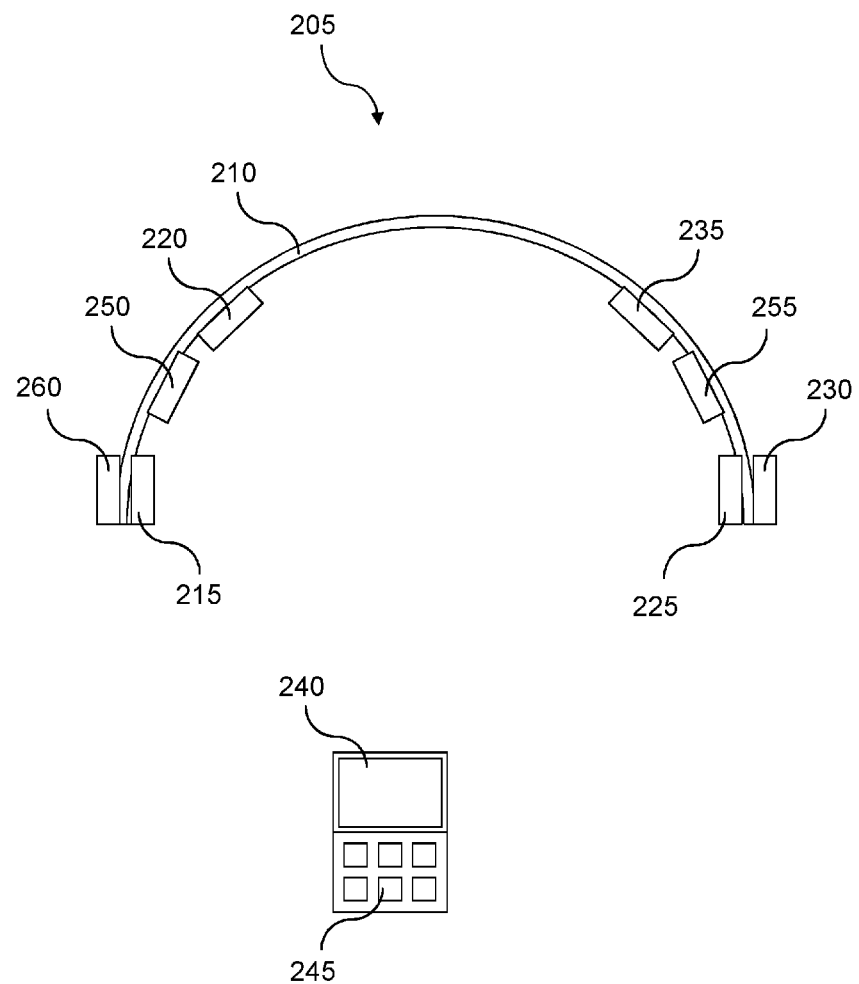

It is observed that the terminals shown in FIG. 1 are to be carried by their users in a pocket or hand, or integrated into clothing or clothing accessory, such as a hood, a mask or a helmet. This last configuration is illustrated in FIG. 2, as part of a noise protection helmet worn on the head of the user. The present invention therefore applies particularly to people having to (or being encouraged to) wear a mask and/or helmet, for example, firefighters, soldiers, workers in hostile environments or fields, paratroopers, skiers, motorcyclists and cyclists.

It is observed in FIG. 2, a helmet 205 having a shell 210, at least one electro-acoustic transducer 215, a localization sensor 220, a vertical position sensor 225, an environment physical value sensor 230, a physiological data sensor 235, a display 240, a keyboard 245, a processing circuit 250 for the sensor signals, a digital communications circuit 255 including a transmission-reception antenna (not shown). Optionally, a secondary communication circuit 260, including an antenna (not shown) provides a communication redundancy.

Shell 210 provides a mechanical protection for ear or skull of the user. The electro-acoustic transducer 215 emits sound waves in accordance with an electric signal. For example, the electro-acoustic transducer 215 is a speaker or a piezoelectric crystal. In embodiments, the electro-acoustic transducer reproduces sound by bone conduction.

The headset 205 also includes a microphone (not shown), e.g. based on the detection of sound or vibrations conveyed by bone conduction.

The localization sensor 220 is configured to provide the geographical location of the terminal 205. For example, the location sensor 220 is based on GPS (Global Positioning System acronym for Global Positioning System) or Galileo (trademark).

The vertical position sensor 225 is, for example, based on an inclinometer, or gyroscope, such as those used in certain tablet computers.

The environment physical value sensor 230 is configured to measure temperature, vibration or noxious gases, for example. This sensor may also include an accelerometer and/or a gyroscope for detecting shocks or the immobility of the wearer 205 of the headset, immobility being detected by setting accelerations thresholds during in a given time. Thus, the absence of acceleration superior to a predetermined threshold during a predetermined time triggers the immobility detection of the helmet's wearer 205.

In embodiments, the sensor 230 is provided with sensors for temperature, gas or potentially hazardous atmospheres, toxic or explosive (CMOS sensors for H2, CO, CO2, NOx, etc.).

The physiological data sensor 235 is configured to measure the heart rate or body temperature of the user. Other examples of such environmental or physiological sensors are given in European patent application No. 09784329.6.

The measured quantities are used by the processing circuit 250 to communicate this information to the wearer and the other terminals 205.

The trigger conditions for the alerts are customizable.

The display screen 240 and keypad 245 are, for example, integrated in a housing worn on the wrist and communicate with a short range means with the processing circuit 250, for example by implementing the Bluetooth standard. In embodiments, the terminal 205 shows on the display 240 its own localization information and those of the other terminals 205 to provide guidance direction to each terminal 205, for research purposes, for example.

The circuit 250 for processing signals from the sensors is based on a microprocessor and is configured to implement a computer program stored in non-volatile memory. The instructions in this computer program allow the implementation of the functions described below, and especially in light of FIGS. 3 and 4. The processing circuit 250 includes a means of synchronization that implements a protocol for continuous synchronization described below. The processing circuit 250 also carries out internal functions to ensure alarm activations or sending messages through the digital communication circuit 255. This thus ensures the safety of users of the terminals 205, including workers in hostile, confined or aggressive environments. These terminals 205 are, for example, equipped with a sound or an internal vibration system in the housing (not shown, type piezoelectric speaker or "buzzer" for example) to generate call or alarm signals independent from the digital communication circuit 255, for example by implementing the secondary communication circuit 260.

The communication circuit 255 uses, to communicate with similar circuits, a time-division multiplexing technology on a single radio channel, selectable in a given frequency band, said system using a wireless communication in "conference" and "hands-free" mode on an autonomous network.

The automatic synchronization means, named "SyncAll", on the signal of any other terminal of a terminal group allows for continuity of communication between each of the terminals of the group within range between them, even with the loss of signal from any of the other terminals of the group. Thus, the network performs a self-synchronization of the terminals, without one of them being neither a "master" or a "base" in regards to the other terminals, thus the communication is not interrupted between terminals in reach from each other in case of loss of the signal from any of the other terminals.

The processing circuit 250 is configured to transmit, by the electro-acoustic transducer 215 the opposite sound that is to say of the sound waves in opposite phase with surrounding sound waves, such that the ear the user is protected against the sounds of excessive amplitude. This opposite sound waves technic being known by skilled peoples, it is not detailed here.

The processing circuit is also configured to superimpose to these negative sound waves the sounds represented by the data frames received by the digital communication circuit 255.

The processing circuit 250 includes means to allocate to the terminal 205, at start up, the group number to which it belongs and a unique order number in this group of terminals. This group number and the order number are defined by the user at terminal configuration, this assignment being already done at the manufacture site of the terminal or not.

The digital communication circuit 255 is configured to transmit and receive digital data over a single channel selected according to a periodic cycle common to all terminals of the group, according to a unique sequence number in the group of terminals, the transmission times of the digital circuitry depending of the unique sequence number within the group, the times of reception taking place during the rest of the periodic cycle.

The digital communication circuit 255 is configured to transmit during the transmission instants, a frame bearing its own time reference, the identifying number of the group to which it belongs and the order number of the terminal 205 in the group, as well as the ordered n-level chaining data of the order numbers of the terminals synchronized together.

The digital communication circuit 255 is configured to, during the commissioning of the terminal, to listen to the network to detect possible transmission of a synchronization frame or data from a terminal of another group and, in such a case, automatically change the communication channel to a free channel to initiate communication with devices of its own group.

The digital communication circuit 255 is configured to, during the commissioning of the terminal, to listen to the network to detect possible transmission of a synchronization frame or data from another terminal of the same group.

The synchronization means is configured to synchronize to the first synchronization signal or data from another terminal 205 of the same group, and in case of not receiving a signal, to transmit at time intervals depending of its order number, its own synchronization signal to the other terminals of the group to initiate communication.

The digital communication circuit 255 is configured to, at regular intervals, perform a re-synchronization by resetting their internal time reference based on the one of the terminal from which they received a data or synchronization frame. The periodic re-synchronization is required to compensate for time base drifts inherent to the internal electronic components (quartz) used, these drifts being responsible of shifting the time cycles and inducing overlap after a certain time, with perturbation of radio transmissions. The period between the re-synchronization depends on the precision of quartz used, for example every five minutes in one embodiment based on quartz FOX924B kind.

In this way, with successive and automatic re-syncs by each terminal 205 on the signal emitted by any of the other terminals of the group 205, the network 105 will get rid of a Sync "Master" or "Base", both at start or during the use of the terminals in the autonomous created network 105. The synchronization protocol implemented on the network 105 enables continuous communications between terminals in the group 205 at radio range of each other, even in case of loss of synchronization signal or data of any other terminal 205 and avoids the need to reconfigure one of the "Slave" mode terminals to a "Master" or "Base" mode.

Regarding the communication protocol with automatic synchronization implemented on the network 105, each terminal 205 is assigned to a group of terminals, with a number as an example. Each group 205 of the terminal is capable of transmitting and receiving digital data over a single channel selected according to a periodic cycle common to all terminals in the group 205. The periodic cycle is actually shared by all terminals since all internal clocks are synchronized with one another during the synchronization/re-synchronization phases of the terminals between them. Each terminal 205 with a unique order number in the group of terminals emits at a time depending on its order number in the group, and remains in 'listening' mode for the rest of the periodic cycle.

Figure 3:
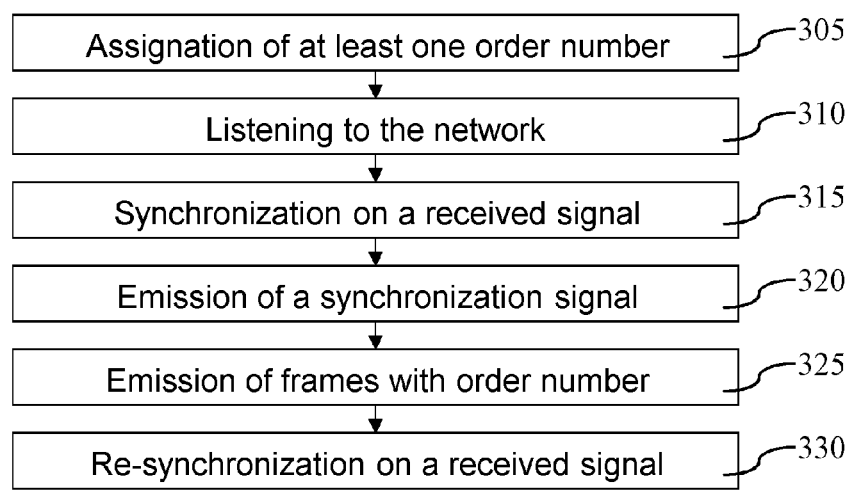
FIG. 3 shows, in a flowchart format, the steps implemented in one implementation way of the method of communication object of the present invention.

As illustrated in FIG. 3, for each terminal 205 at start, a unique "active" order number is assigned to the terminal 205 in the group of terminals, in a step 305.

Alternatively, at least one "passive" order number is assigned to a terminal allowing it a "listen-only" mode in a particular group.

As the "active" order number, the "passive" is defined either by the user, at terminal configuration, either by the supplier.

Each terminal 205 starts communication at commissioning, in a step 310, for an initial phase of listening to the network, for a period which depends on its order number in the group, to detect a potential emission of a synchronization signal or data from another terminal 205 of the same group.

During this initial listening phase, the terminal 205 synchronizes, during a step 315, to the first synchronization or data signal from another terminal of the same group. In case of non-receipt of the synchronization or data signal during a step 320, the terminal 205 transmits at regular intervals depending on its order number, its own synch signal to the other terminals 205 of the group to initiate communication. These emissions are alternated with phases of listening to the network.

Then, in a step 325, the terminal 205 transmits during a part of the periodic cycle dependent of its order number in the group, a frame bearing its own time reference signal and its order number in the group. Each terminal 205 determines its emission time based on its own order number in the group and the order numbers of the other terminals 205 in the group, and assigns the rest of the periodic cycle time to listening phases of the other terminals.

Note that the frame itself is used to synchronize: each frame sent by a terminal is identified by the group number; the order number and n-level chaining of order numbers of the terminals synchronized between them, whether it is a sound frame, a data frame or a short frame called "synchronization" frame. For each received frame, the terminal knowing what other terminal it comes from, it can synchronize itself using this frame during a synchronization or resynchronization phase by readjusting its internal time reference to the terminal from which he received the frame.

In a step 330, the terminal 205 retries, at a time depending on its order number, a phase of re-synchronization to the signal received from a terminal of the group. It is noted that there are two resynchronization cases:

1) re-synchronization due to signal loss

If the terminal does not receive any frame from any other terminal of the group (out of range, for example), it goes in sync mode:

the terminal listens to the network to receiving a potential frame from another terminal of the group, upon receipt of such a frame, the device synchronizes to this frame, since this frame contains the order number of the transmitting terminal, the receiver terminal determines the time allocated for transmission during the periodic transmission cycle, the remaining time being assigned to reception of frames sent by the other terminals in the group.

Synchronization consists in setting the internal time reference of the terminal to the terminal from which it received the frame to define the common and recurring cycle time and in case of non-receipt of such a frame, the terminal performs, at regular intervals depending on its order number and alternating with listening to the network phases, a synch short frame emission (containing its order number) to allow other terminals to synchronize on it.

2) automatic periodic re-synchronization

To compensate for the temporal drift of the time reference of the different terminals with each other, it is necessary at regular time intervals (the time interval depending on the quality and the accuracy of the internal time reference of the terminals, for example five minutes with a quartz FOX924B) to resynchronize one terminal with another. When the time delay represented by this time interval has elapsed, the terminal, for a defined period of time (e.g. 30 seconds), uses a frame received preferentially from an active terminal of the group with the smallest order number in the group, or the terminal being the closest (in number of nodes in the network) of said terminal having the smallest order number (whether from a sound, data, or synchronization frame) to re-synchronize to this frame. After this period of priority re-synchronization, the terminal synchronizes to the first frame received from another terminal of the group. These successive re-syncs help ensure that the cycle time is common to all terminals by propagating a common universal time reference between terminals. Note that during this phase of re-synchronization, the terminal continues to transmit its frames during its allocated time slots in the common periodic cycle, thus ensuring continuity of communication, including during these resynchronization phases.

In terms of steps, each terminal having a defined group identifier and an order number (at factory configuration or by user configuration), they perform:

a start of the terminal, an entry to the sync mode [SYNC LOOP]

In the event of receiving a frame from another terminal of the group, a synchronization of the internal reference time and exits [SYNC LOOP]

In the absence of receipt of such a frame, a transmission of a synchronization frame at an interval of time dependent on its order number regular time to attempt to initiate communication;

an entry to the communication mode [PERMANENT LOOP] with a transmitting/receiving frames according to the time intervals in the time periodic cycle, in case of total failure to receive any other terminal group for several cycles, stopping transmissions and a getting to the sync mode described above [SYNC LOOP]

when the time to perform the re-synchronization of the time reference is achieved, a re-synchronization of the periodic cycle on the frame received from the active terminal with the smallest order number in the group, or the terminal being the closest (in number of nodes in the network) of said terminal having the smallest order number.

In this way, with successive and automatic re-syncs by each terminal 205 on the signal emitted by any of the other terminals of the group 205, the network 105 can get rid of a Sync "Master" or "Base", both at start or during the use of the terminals in the autonomous created network 105.

This particular embodiment of the present invention, with successive and automatic re-syncs by each of the terminals 205 of the group, ensures continuity of communication between each member of the group in radio range with each other, even when losing the signal of any other terminal in the group, and avoids the requirement to reconfigure one of the "Slave" terminals to a "Master" one, which corrects the disadvantages of other existing systems which often require special settings incompatible with the needs of users in the field.

In embodiments, the terminal 205 is configured for transmitting and receiving localization data to or from other terminals of the group. Moreover, in embodiments, the device 205 is configured to analyze the localization information of other terminals of the group based on the information received and the order number identifying each terminal 205 of the group.

In embodiments, the helmet 205 includes a means of calling (paging) other helmets of a group of helmets; this means of calling is independent from the digital voice circuit and configured to transmit an alarm or sound signal to the other helmets of the group.

In embodiments, the helmet 205 includes means (not shown) to configure itself in a listen mode to listen to any other headset of the same kind, even belonging to a different group, by simple knowledge of the group identifier of the said other helmet 205.

In embodiments, this headset 205 includes a means to configure itself to a "secret" mode preventing access to its data, by coding the transmitted data, to any other headset of the same kind, even in listening mode and knowing the group identifier of the said helmet.

A Time Division Multiplex (TDM) implementation used in the present invention is shown below, with the following conventions:

the transmission time "D" for each terminal "x" group is the same, and starts at time tx (tx therefore indicates the start time of issue to the x terminal), the rank "Rx" of each terminal "x" indicates the position in the group, the "n" number of possible terminals in the group gives the total cycle time "C" so that $D*n=C$.

The table below gives an example, for six terminals, of the temporal distribution of the time of transmission:

| 1 | | | | | |
|---|---|---|---|---|---|
| | 2 | | | | |
| | | 3 | | | |
| | | | 4 | | |
| | | | | 5 | |
| | | | | | 6 |

To expose the TDM, it takes, for example, the synchronization of the terminal T4 on the rest of the group, in the case where only the terminals T1, T3 and T5 are within range of the signal terminal T4. T4 terminal is in sync mode, in listening phase.

| D1 | | | | | |
|---|---|---|---|---|---|
| | | D3 | | | |
| | | | | D5 | |
| | | D4 ? | | | |

The planned emission start time for terminal T4 is "t4p" which is not necessarily synchronized with the rest of the group. In the first case, terminal T4 receives the signal transmitted by terminal T5, at time t5, and identifies it as such. In this case, the T4 terminal calculates its own next start time for emitting.

The difference in rank between the two terminals is $(R5-R4)=1$. The new t4 for T4 terminal is given by the formula:

$$t4=t5+C-(R5-R4)*D=t5+C-D.$$

In the second case, the T4 terminal first receives the signal from the T3 terminal. T4 terminal then computes its own next t4 transmission start time. The Rank difference between the two terminals being $(R3-R4)=1$, the new t4 emission time for T4 terminal is given by the formula:

$$t4=t3+C-(R3-R4)*D=t3+C+D.$$

In the third case, the T4 terminal first receives the signal from the terminal T1. T4 terminal then computes its own next transmission start time t4. The Rank difference between the two terminals is $(R1-R4)=-3$, the new emission time t4 for T4 terminal is given by the formula:

$$t4=t1+C-(R1-R4)*D=t1+C+3D$$

The inventors have also determined that there is a general problem with the wireless conferencing systems for several people. In this type of systems, more time is generally spent by people not speaking thus where the communicating circuits are sending signals representing a silence. For example, in a three-persons-conference, even if users are constantly talking, only one of three really talks at a time. Thus, the communication circuits emit signals representing voice only a third of the time, on average, for each one. The average usage in a three-persons-conference therefore comprises at least two thirds of "silence" signals.

Correspondingly, the multiparty conference mode in full duplex involves regular transmissions from each terminal in the network to maintain synchronization between them.

The radio frequency transmission is subject to a usage rate, called "Duty Cycle". Depending on the used radio frequency band, the authorized occupancy rate in the band for each terminal can vary from 0.1% to 100%, on average, over one hour of use. For example, in the band 869.400 MHz to 869.650 MHz, the occupancy rate is at maximum 10% in Europe.

This constraint forces the limit time radio transmission, which results in:

the need to reduce the amount of information to be transmitted, resulting in a lower quality of sound in an audio context or the need to increase the information transmission speed, resulting in a lower radio range and/or a lower number of potential radio channels because of the frequency bandwidth rise for each channel.

Furthermore, the radio transmission consumes energy and the battery life of radios systems is strongly affected by the transmission time (see the phones standby/communication autonomy). The full-duplex systems therefore have more limited autonomy, with equivalent specifications, than the Half-duplex systems.

Figure 4:
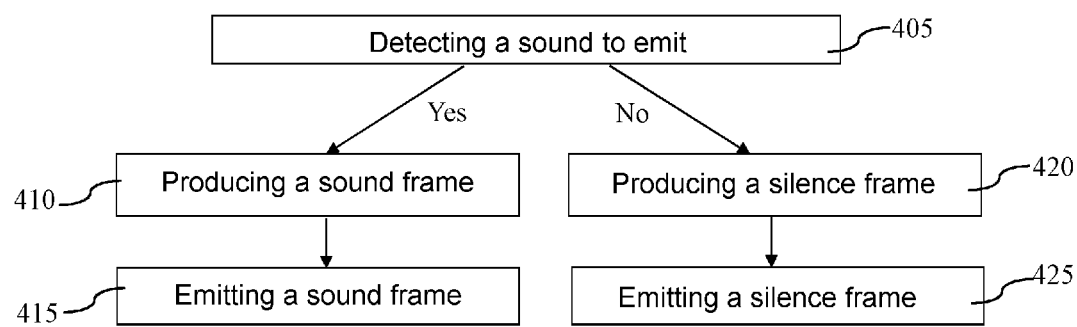
FIG. 4 shows, in the form of a flowchart, the steps implemented in one other implementation way of the method of communication object of the present invention and FIG. 5 schematically shows a particular network configuration of the terminals objects of the present invention.

As illustrated in FIG. 4, in embodiments of the method of the present invention, it is determined in a step 405, if a sound is to be represented by a digital signal from the communication circuit 255. The detection of a sound to be transmitted is based on the sound level (energy) in a band near to the audible frequency band (300 to 3000 Hz, for example) and not on the type of sound. The purpose is to enable the users to remotely identify what one of them may hear without hiding any event.

When a sound has been detected, during a step 410, a representative frame of the detected sound is constructed in a conventional way and, in a step 415, the frame thus formed is transmitted at the next communication cycle.

When a terminal 205 does not have to transmit sound because no sound is detected in step 405, instead of sending data containing "silence" (which takes as many bytes to transmit than a normal sound), in a step 420, much shorter frames of data simply meaning "Silence" are constructed. The information sent by the radio during a step 425 are thus significantly reduced in size, and consequently the transmission time is much shorter, resulting in a much lower occupancy of the radio band and an increased autonomy.

Preferably, in step 425, instead of sending the "Silence" frames at each cycle of time (as done when transmitting a "sound"), this frame is sent only one time over n. For example n=10. Thus, during the silence phases, it transmits the data n times less often, resulting in much lower occupancy of the frequency band.

During the silence phases, the emitted information is therefore not only shorter, but also occurs less often.

This solution also allows take the opportunity of silence times to transfer data coming from the integrated sensors of the terminal 205.

Figure 5:
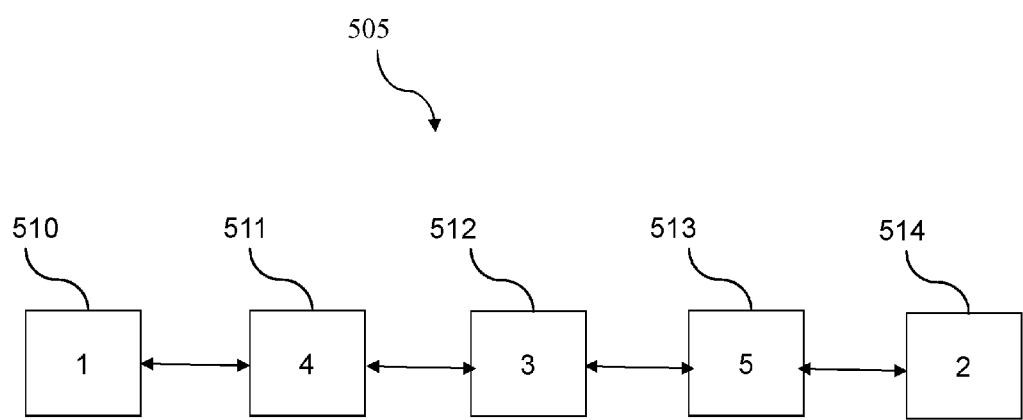

Finally, the inventors have also found that some extreme cases could cause synchronization problems. In FIG. 5 five terminals 510-514 constitute a network 505 between terminals. Arrows mean that they are at radio range with one another and therefore they can communicate with each other and only the terminals interconnected by the arrows are at radio range with each other. In the current state of the art based on the Master/Slave technology, a Master is set manually and only the terminals that are within radio range can speak with it, the others being disconnected from said network (in our example, if the terminal 510 is the Master, only the terminal 511 is part of the network, the others are not within range of 510). The other possibility is the dynamic creation of Master, which creates two sub-networks of two or three terminals (e.g. terminal 511 is the Master of the 510 and 512 terminals and terminal 514 is the master of terminal 513). The coexistence of two subnets causes problems for terminals 512 and 513 receiving frames of the two sub-networks with time cycles that can overlap and cause collisions of the radio frames. This solution cannot guarantee correct operation of communications for these two terminals, including for the 512 and 513 terminals, which, although in radio range with each other, cannot communicate together because they are not synchronized on the same time reference since they do not have the same Master.

The synchronization method proposed in the present invention avoids the problems of this configuration by implementing a priority mechanism for synchronization. Indeed, in this example, the terminal 510 could be synchronized to the terminal 511 and vice versa, and the terminals 512, 513 and 514 could be synchronized with each other. Eventually, there would potentially be two sub-networks consisting of 510 and 511 terminals on one hand, and terminals 512, 513 and 514, on the other. Each sub-network would be independent time base, which could drift compared to that of the other sub-network, and eventually cause a periodic cycle overlaps and therefore collisions during transmission of frames.

The implementation of the principle of prioritized synchronization described in this invention avoids this problem by encouraging terminals to select one terminal rather than another to resynchronize when they have a choice. To avoid the possibility of creating two subnets, the depth of the chaining of order numbers of terminals sync with each other should equal the number of terminals in the group minus three, as 5−3=2 in our example. Thus, in this configuration, the frames sent respectively contain:

for 510 terminal: "1-4, 1" (meaning: I have the order number "1" and I'm synchronized to T4 which is itself synchronized to T1), for 511 terminal: "4-1, 4" (meaning: I have the order number "4" and I'm synchronized to T1 which is itself synchronized to T4), for 512 terminal: "3-4, 1" (meaning: I have the order number "3" and I'm synchronized to T4 which is itself synchronized to T1), for 513 terminal: "5-3, 4" (meaning: I have the order number "5" and I'm synchronized to T3 which is itself synchronized to T4), for 514 terminal: "2-5, 3" (meaning: I have the order number "2" and I'm synchronized to T5 which is itself synchronized to T3).

So, when the terminal 512 should resynchronize, it potentially has a choice between the terminal 511 and the terminal 513 both within range. Without priority mechanism, it could choose one or the other with the risk of creating a new subnet if it chooses the terminal 513 (there would then be a subgroup with 510 and 511 terminals, and a second subgroup with 512, 513 and 514 terminals). But by applying the algorithm of taking the smallest order number or the nearest terminal with the smaller order number, then terminal 512 will preferably chose terminal 511 which contains the order number "1" in his frame "4-1, 4", while the smallest order number appearing in the "5-3, 4" frame received from terminal 513 is "3".

Similarly, the terminal 513 can choose between the terminal 512 and the terminal 514 but will chose the terminal 512 which frames contains the order number "1" (<<3-4, 1>>), while the terminal 514 frames' show "2" as the smallest order number (<<2-5, 3>>). Finally, the terminal 511 can choose between the terminal 510 which has the frame "1-4, 1" and terminal 512 which has the frame "3-4, 1." The smallest number is "1" and is present in both frames, so the algorithm determines that terminal 510 has the priority because it is the terminal for which this smallest order number has the highest Rank in the frames (Rank "1" in the terminal 510's frame and Rank "3" in terminal 512's frame). This priority mechanism allows each terminal to synchronize preferentially with the active terminal having the smallest order number in the group, or to the closest terminal (in terms of network nodes) of the active terminal having the smallest order number, and thus prevent the creation of multiple subnets.

The invention claimed is:
1. A communication terminal, comprising:
a digital communication circuit utilizes a time division multiplexing on a single radio channel, selectable in a given frequency band, the communication terminal implements a wireless communication in conference and hands-free mode on an autonomous network between at least two wearers of similar communication terminals, the digital communication circuit is configured so that each frame transmitted contains both an order number of the communication terminal in a group and an ordered chaining data of the order numbers of the communication terminals synchronized with each other for the group comprising more than three communication terminals;

an automatic synchronizer synchronizes to a signal of any of other communication terminals in the group of terminals, synchronizes an internal time reference, thus a periodic cycle time, to a time reference common for all terminals of the group, the synchronization being based on the order number of a transmitting terminal present in a frame, and calculates a transmission time slot in the periodic cycle time of the time division multiplexing in accordance with the order number; and wherein the automatic synchronizer conducts re-synchronizations by resetting its internal clock to that of a receiving terminal of the group from which it has received a frame, when the group is composed of more than three communication terminals, the automatic synchronizer implements resynchronization in accordance with the order number of the transmitting terminal and the ordered chaining data of order numbers of the terminals synchronized with each other.

2. The communication terminal according to claim 1, wherein the digital communication circuit is configured so that each frame transmitted comprises an identifier of the group to which the communication terminal belongs.

3. The communication terminal according to claim 1, wherein the digital communication circuit is configured so that the ordered chaining data of order numbers of terminals mutually synchronized, which is sent in each frame, is ordered on a plurality of levels.

4. The communication terminal according to claim 1, wherein the automatic synchronizer resynchronizes its internal clock with that of the receiving terminal of the group from which it has received a synchronization or data frame by implementing a priority based on a sequence of numbers in frames received from other terminals having the order number of the transmitting terminal.

5. The communication terminal according to claim 4, wherein the automatic synchronizer resynchronizes its internal clock to that of an active terminal in the group by implementing a priority of synchronization on the active terminal of the group having a highest priority level in the group.

6. The communication terminal according to claim 5, wherein the automatic synchronizer, failing to receive frames from the active terminal with the highest priority level in the group, synchronizes to a nearest active terminal having a next highest priority level in the group.

7. The communication terminal according to claim 1, wherein the digital communication circuit is configured to transmit and receive, by time division multiplexing, the digital data on a selected unique radio channel according to the periodic cycle time common to all terminals of the group and based on an unique order number in the group of terminals; wherein transmission of the digital data depends on the unique order number in the group; and wherein reception taking place during rest of the periodic cycle time, the periodic cycle time being based on the time reference common to all terminals in the group set during synchronization of the terminals.

8. The communication terminal according to claim 1, wherein the digital communication circuit is configured to, when the communication terminal is starting, listen to the autonomous network to detect a possible transmission of a synchronization or data frame from a communication terminal of another group and to automatically change the channel to a free channel to initiate communication with the communication terminals in its own group.

9. The communication terminal according to claim 1, wherein the digital communication circuit is configured to, when the communication terminal is starting, listen to the autonomous network to detect a possible transmission of a synchronization or data frame emitted by another communication terminal in the same group.

10. The communication terminal according to claim 1, wherein the automatic synchronizer is configured to synchronize with a first synchronization or data signal emitted by another communication terminal in same group; and wherein the automatic synchronizer is configured, upon non-receipt of the first synchronization or data signal from another communication terminal, to emit a synchronization signal at time intervals in accordance with its order number to other communication terminals in the same group to initiate a communication.

11. The communication terminal according to claim 1, wherein the digital communication circuit is configured to detect an absence of signals transmitted by a counterpart terminal in its group and is configured to, upon detection of the absence of signals, enter into a communication mode comprising alternating:

network listen phases to detect a possible emission of a synchronization or data signal emitted by another communication terminal in same group; and communication initialization phases to initiate a communication by transmitting a synchronization signal addressed to other communication terminals in the group.

12. The communication terminal according to claim 1, wherein the digital communication circuit continues to transmit its data and synchronization frames during a time allocated for the re-synchronization.

13. The communication terminal according to claim 1, further comprising at least one of a sensor or an internal device that ensures triggering of alerts or transmission of messages to other communication terminals in the group by the digital communication circuit.

14. The communication terminal according to claim 1, further comprising at least one of an accelerometer or a gyroscope to detect shocks or immobility of a wearer of the communication terminal and its orientation in a vertical plane.

15. The communication terminal according to claim 1, further comprising at least one of a temperature sensor, a gas sensor or a potentially dangerous atmosphere sensor that communicates a sensor information to a wearer of the communication terminal and to other communication terminals.

16. The communication terminal according to claim 1, further comprising at least one sensor of a geographical position of the communication terminal.

17. The communication terminal according to claim 1, further comprising a processing circuit that determines whether a sound is, or not, to be represented by a signal transmitted by the digital communication circuit, the digital communication circuit being configured to, when no sound is represented, transmit a frame having a smaller size than a frame representative of the sound and information relating to this absence of sound.

18. The communication terminal according to claim 17, wherein the digital communication circuit is configured to, in case of no sound to represent, transmit only one frame meaning this absence for a plurality of communication cycles.

19. An audio headset comprising a communication terminal comprising:
- a digital communication circuit utilizes a time division multiplexing on a single radio channel, selectable in a given frequency band, the communication terminal implements a wireless communication in conference and hands-free mode on an autonomous network between at least two wearers of similar communication terminals, the digital communication circuit is configured so that each frame transmitted contains both an order number of the communication terminal in a group and an ordered chaining data of the order numbers of the communication terminals synchronized with each other for the group comprising more than three communication terminals;
- an automatic synchronizer synchronizes to a signal of any of other communication terminals in the group of terminals, synchronizes an internal time reference, thus a periodic cycle time, to a time reference common for all terminals of the group, the synchronization being based on the order number of a transmitting terminal present in a frame, and calculates a transmission time slot in the periodic cycle time of the time division multiplexing in accordance with the order number; and
- wherein the automatic synchronizer conducts re-synchronizations by resetting its internal clock to that of a receiving terminal of the group from which it has received a frame, when the group is composed of more than three communication terminals, the automatic synchronizer implements resynchronization in accordance with the order number of the transmitting terminal and the ordered chaining data of order numbers of the terminals synchronized with each other.

20. The audio headset according to claim 19, further comprising a noise cancellation protection device of an active type that emits opposite noise waves with an electro-acoustic transducer which emits sound messages received through the digital communication circuit.

* * * * *